United States Patent
Ishizaka (10) Patent No.: US 9,515,728 B2
(45) Date of Patent: Dec. 6, 2016

(54) LIGHT SOURCE MODULE AND OPTICAL TRANSCEIVER

(71) Applicant: Fujitsu Optical Components Limited, Kawasaki-shi, Kanagawa (JP)

(72) Inventor: Tetsuo Ishizaka, Inagi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/283,521

(22) Filed: May 21, 2014

(65) Prior Publication Data
US 2015/0311976 A1    Oct. 29, 2015

(30) Foreign Application Priority Data
Jun. 4, 2013 (JP) ................. 2013-117857

(51) Int. Cl.
*H04B 10/40* (2013.01)
*H04B 10/079* (2013.01)

(52) U.S. Cl.
CPC ........ *H04B 10/07955* (2013.01); *H04B 10/40* (2013.01)

(58) Field of Classification Search
USPC .... 398/91, 92; 385/14; 372/32, 26, 50.1, 24, 372/39, 4
See application file for complete search history.

(56) References Cited

U.S. PATENT DOCUMENTS

| | | | | |
|---|---|---|---|---|
| 5,555,330 A * | 9/1996 | Pan | ................. | G02B 6/2746 359/484.03 |
| 6,580,531 B1 * | 6/2003 | Swanson | ................. | H04B 10/572 398/158 |
| 7,962,044 B2 * | 6/2011 | McCallion | ................. | G02B 6/4201 356/454 |
| 2004/0228373 A1 * | 11/2004 | Tatsuno | ................. | H01S 5/0687 372/29.02 |
| 2004/0228577 A1 * | 11/2004 | Pezeshki | ................. | G02B 6/32 385/31 |
| 2005/0030520 A1 | 2/2005 | Wada et al. | | |
| 2011/0051143 A1 * | 3/2011 | Flanders | ................. | G01B 9/02004 356/451 |

(Continued)

FOREIGN PATENT DOCUMENTS

| | | |
|---|---|---|
| JP | 2000-124541 | 4/2000 |
| JP | 2005-140619 | 6/2005 |

(Continued)

OTHER PUBLICATIONS

Patent Abstracts of Japan, Publication No. 2000-124541, Published Apr. 28, 2000.

(Continued)

*Primary Examiner* — David Payne
*Assistant Examiner* — Omar S Ismail
(74) *Attorney, Agent, or Firm* — Staas & Halsey LLP (57) ABSTRACT

A light source module includes a single light source with two opposite light outputting faces, a first optical amplifier and a second optical amplifier provided on opposite sides of the light source adjacent to the corresponding light outputting faces, and a first monitor configured to monitor an output of the first optical amplifier, wherein a power output level of the first optical amplifier is controlled independently from the second optical amplifier based upon a monitoring result of the first monitor.

9 Claims, 11 Drawing Sheets

(56) References Cited

U.S. PATENT DOCUMENTS

| | | | | |
|---|---|---|---|---|
| 2013/0148674 A1* | 6/2013 | Nowak | ............... | H01S 5/0622 372/26 |
| 2013/0315269 A1* | 11/2013 | Liu | ................... | H01S 5/06256 372/20 |
| 2013/0321820 A1* | 12/2013 | Flanders | ............ | G01B 9/02004 356/479 |
| 2014/0018685 A1* | 1/2014 | Taira | .................... | A61B 1/043 600/476 |

FOREIGN PATENT DOCUMENTS

| | | |
|---|---|---|
| JP | 2009-135312 | 6/2009 |
| WO | 2012/107815 | 8/2012 |

OTHER PUBLICATIONS

Patent Abstracts of Japan, Publication No. 2005-140619, Published Jun. 2, 2005.
Patent Abstracts of Japan, Publication No. 2009-135312, Published Jun. 18, 2009.
Chinese Office Action dated Apr. 11, 2016 in Application No. 201410240554.9.

* cited by examiner

LIGHT SOURCE MODULE AND OPTICAL TRANSCEIVER

CROSS-REFERENCE TO RELATED APPLICATIONS

This application is based upon and claims the benefit of priority of the prior Japanese Patent Application No. 2013-117857 filed on Jun. 4, 2013, which is incorporated herein by reference in its entirety.

FIELD

The embodiments discussed herein relate to a light source module and an optical transceiver using the same.

BACKGROUND

In recent years and continuing, demand for innovating optical transmission systems is growing along with increase in transmission traffic. The same degree of transmission distance and frequency usability as those in the conventional 10 Gbit/s systems is required for the next-generation optical transmission systems. To achieve this, practical use of digital coherent optical communication schemes, which are superior in optical signal-to-noise ratio (OSNR) tolerance and nonlinearity tolerance compared to non-return-to-zero (NRZ) modulation scheme of the conventional systems, has been promoted.

Figure 1:
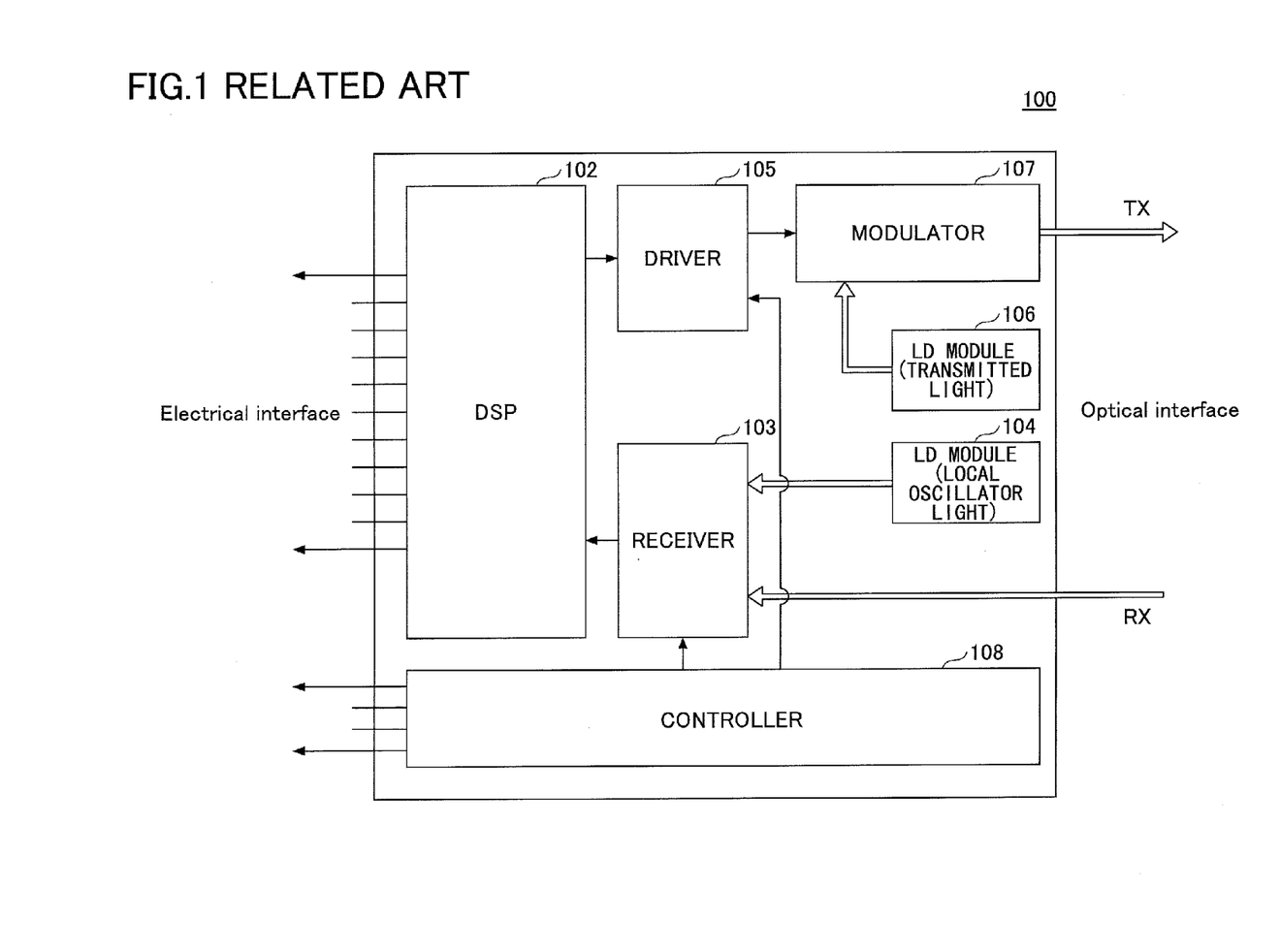
FIG. 1 is a schematic diagram of a conventional optical transceiver.

FIG. 1 illustrates a conventional digital coherent optical transceiver 100. The optical transceiver 100 uses separate light sources for the transceiver and the receiver. A laser diode (LD) module 106 is used for transmission and an LD module 104 is used as a local oscillator source on the receiver side. A digital signal processor (DSP) 102 applies a prescribed modulation scheme to inputted data signals to cause a driver 105 to drive a modulator 107. The modulator 107 modulates continuous light emitted from the LD module 106 by data driving signals and outputs the modulated signals from the optical transmitter 100.

On the receiving side, an optical signal received at a receiver 103 is subjected to separation of polarized components, and each component interferes with the corresponding component of local oscillator light emitted from the local oscillator LD module 104 to extract an in-phase component and an orthogonal component. The DSP 102 carries out synchronization between the received signal and the local oscillator light, mitigates linear distortion due to wavelength dispersion, and demodulates the received signal as an electric signal.

In each of the LD modules 104 and 106, a high reflective coating is provided to the rear end face and an anti-reflection coating is provided to the output face (or the front end face) of the laser device.

A technique for monitoring an output from the rear end face of a laser device is proposed to maintain the light level emitted from the front end face of the laser device constant. See, for example, Japanese Laid-open Patent Publication No. 2000-124541. Another technique for superimposing light beams output from the front end face and the rear end face of a laser diode on an object to be measured is proposed to reduce a size and power consumption of a speed meter. See, for example, Japanese Laid-open Patent Publication No. 2005-140619. Still another technique for arranging micro prisms to the front end face and the rear end face of each of the laser devices of a laser array to deflect the light beams output from the front end face and the rear end face is also proposed. See, for example, Japanese Laid-open Patent Publication No. 2009-135312. With this technique, the irradiation angle of the light is widened.

The layout illustrated in FIG. 1 in which a transmitted light source and a receiving light source are separately used is disadvantageous from the viewpoint of the device size and power consumption.

It is desired to use a single light source module, while controlling transmitted light and local oscillator light independently from each other, to make an optical transceiver compact and reduce power consumption.

SUMMARY

According to an aspect of the embodiments, a light source module includes a single light source with two opposite light outputting faces, a first optical amplifier and a second optical amplifier provided on opposite sides of the light source adjacent to the corresponding light outputting faces, and a first monitor configured to monitor an output of the first optical amplifier, wherein a power output level of the first optical amplifier is controlled independently from the second optical amplifier based upon a monitoring result of the first monitor.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 2:
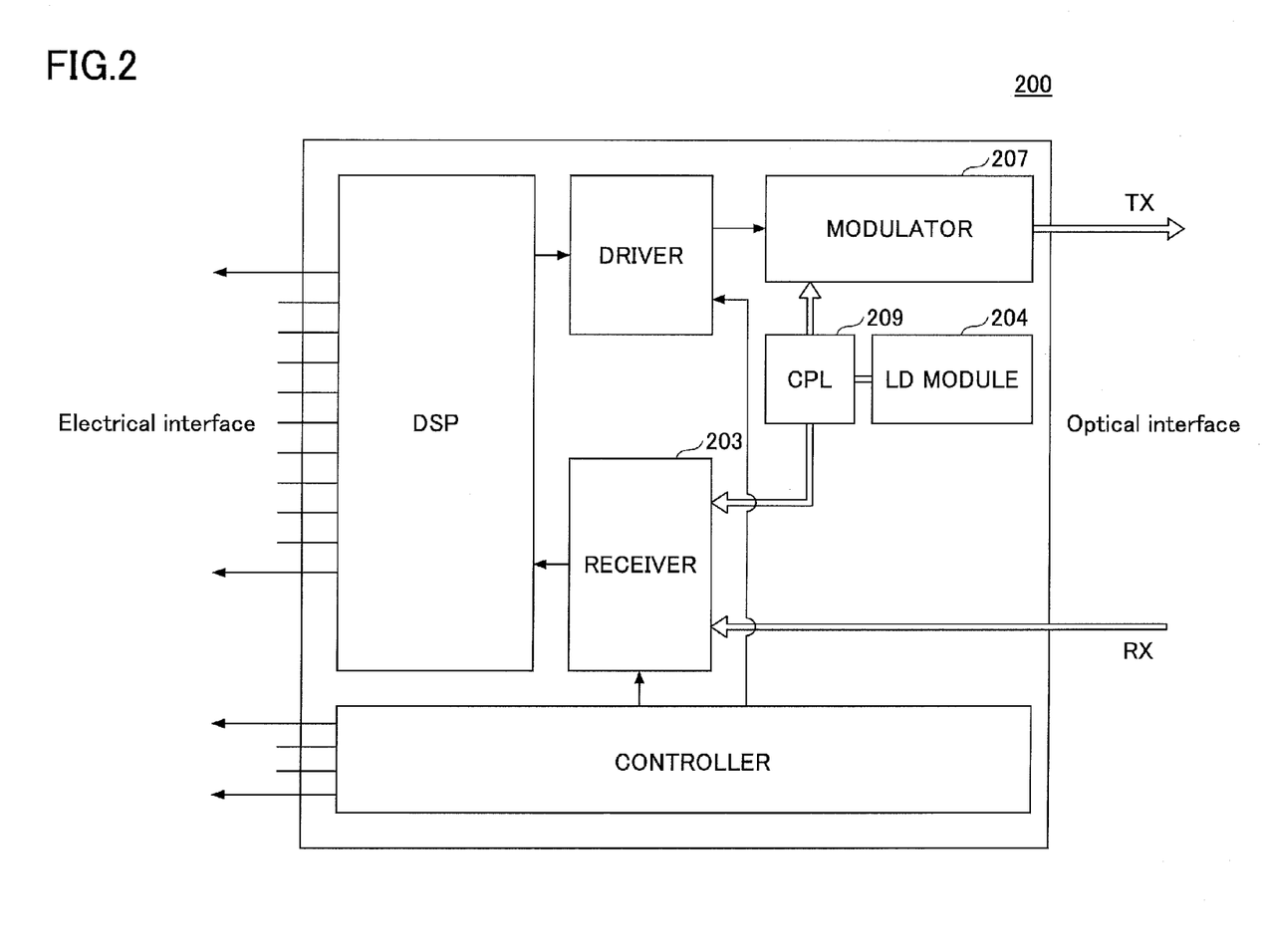
FIG. 2 is a schematic diagram of a structure conceived during the process leading to the embodiments.

To solve the disadvantages of the conventional structure of FIG. 1 using separate light sources for the transmission system and the receiving system, a structure illustrated in FIG. 2 may be conceived during the process leading to the embodiments. In FIG. 2, a light beam output from a single LD module 204 is separated into two branches by an optocoupler 209, and the separated light beams are input to the modulator 207 and the receiver 203, respectively.

However, the structure illustrated in FIG. 2 also raises some issues. First issue is a loss produced in the optocoupler 209, which loss has a need for a high-power LD module 204. When using a 1×2 optocoupler 209 with a split ratio of 1 to 1, the loss become about 4 dB.

The second issue is difficulty in optimizing the optical transceiver 200 because the transmitted light (or the signal light) and the local oscillator light cannot be independently controlled when using the optocoupler 209. Accordingly, the embodiments described below provide techniques for independently controlling the transmitted light and the local oscillator light with a single light source module and reduce sizes and power consumption of the optical transceiver.

First Embodiment

Figure 3:
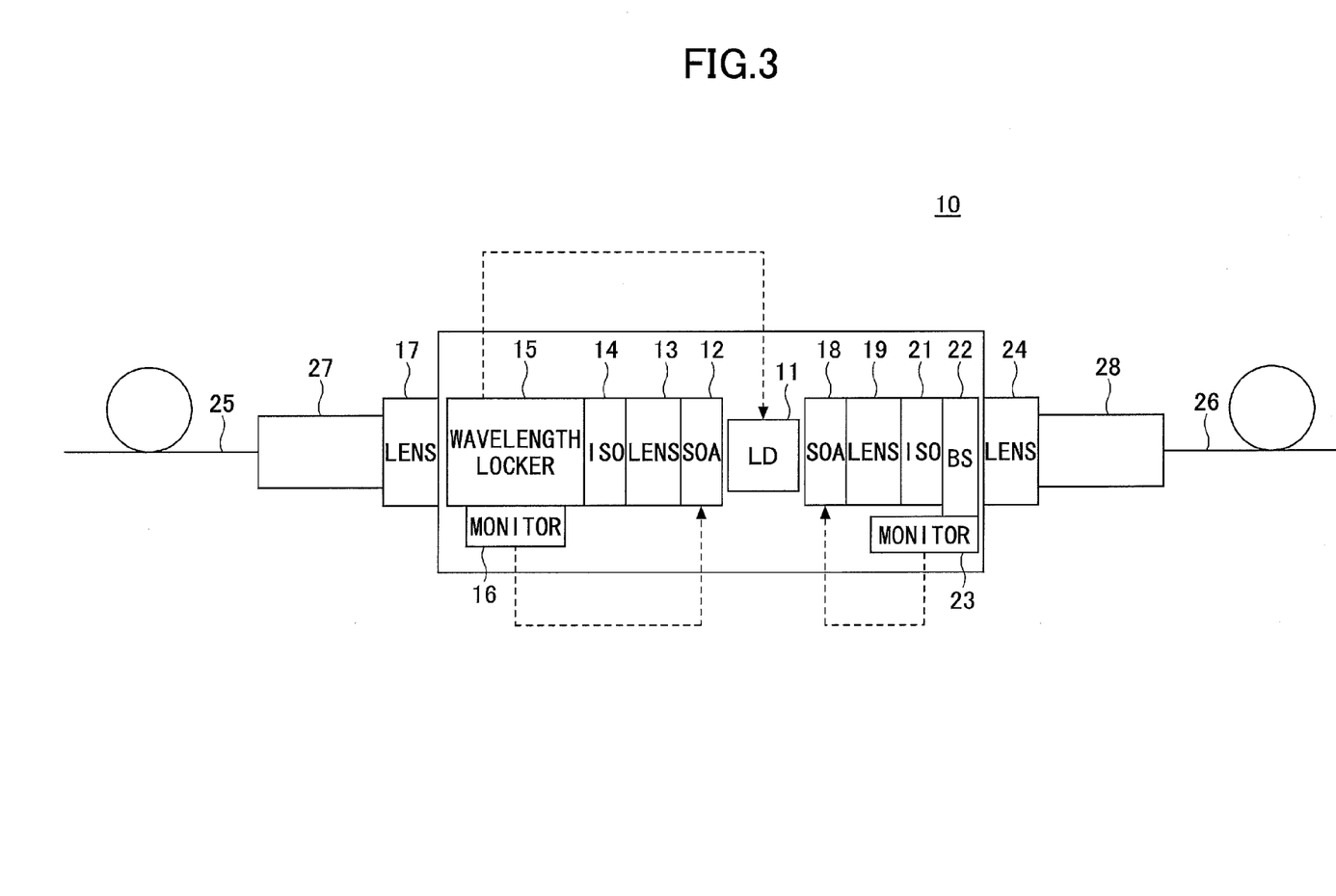
FIG. 3 is a schematic diagram of a laser module according to the first embodiment.

FIG. 3 is a schematic diagram of a laser module 10 according to the first embodiment. The laser module 10 has a single semiconductor laser diode (LD) 11. Along the optical axis of the LD 11, a semiconductor optical amplifier (SOA) 12, a lens 13, an optical isolator 14 and a monitor 16 are arranged on one side of the LD 11, while a SOA 18, a lens 19, an optical isolator 21 and a monitor 23 are arranged on the other side of the LD 11. A wavelength locker 15 is provided to said one side of the LD 11.

The LD 11 emits light beams from both the front end face and the rear end face (which end faces are perpendicular to the optical axis of the LD 11). The LD 11 is typically a tunable light source such as a distributed feedback laser diode (DFB-LD) array or a distributed Bragg reflector (DBR), but is not limited to this example. For example, a single wavelength semiconductor laser may be used.

The SOA 12 amplifies the light beam output from said one of the end faces of the LD 11, and the SOA 18 amplifies the light beam output from the other end face. The light beam amplified by the SOA 12 passes through the lens 13, the optical isolator 14 and the wavelength locker 15, and is output from one end of the laser module 10. The light beam amplified by the SOA 18 passes through the lens 19, the optical isolator 21 and a beam splitter 22, and is output from the other end of the laser module 10.

The laser module 10 is connected at one end to an optical transmission path 25 by an optical connector 27, and connected at the other end to an optical transmission path 26 by an optical connector 28. The light beam output from the wavelength locker 15 is coupled to the optical transmission path 25 (formed by, for example, an optical fiber) by a lens 17. The light beam output from the beam splitter 22 is coupled to the optical transmission path 26 by a lens 24.

The monitor 16 is positioned after (or behind) the SOA 12 and monitors the first output beam. The monitor 23 is positioned after (or behind) the SOA 18 and monitors the second output beam. The monitoring result of the monitor 16 is fed back to the SOA 12, and the monitoring result of the monitor 23 is fed back to the SOA 18.

The light beams output from the two opposite end faces of the LD 11 are amplified by the SOA 12 and the SOA 18 and detected by the monitor 16 and the monitor 23, respectively. The light beams detected as electric currents by the monitor 16 and the monitor 23 are subjected to power detection in a controller (not illustrated in FIG. 3, but see FIG. 6 or FIG. 7), and the monitoring results are then supplied to the SOA 12 and the SOA 18, respectively. With this arrangement, the output levels of the two light beams emitted from the laser module 10 can be controlled and stabilized independently from each other.

In addition, the wavelength locker 15 monitors the oscillation wavelength of the LD 11. Based upon the central wavelength detected by the wavelength locker 15, the oscillating wavelength of the LD 11 is controlled such that the output wavelength is locked to a fixed wavelength. This arrangement stabilizes the wavelength of the LD 11.

In the example of FIG. 3, the light beam output from either end of the LD 11 may be used for the transmission system or the receiving system. For example, the light beam from the wavelength locker 15 may be used as an optical carrier wave, and the light beam from the beam splitter 22 may be used as a local oscillator light.

With the structure of the first embodiment, transmitted light (or signal light) and local oscillator light used in digital coherent optical communication are generated by a single laser module 10. Using a single light source such as the LD 11 and arranging the SOA 12 and the SOA 18 on opposite output sides of the LD 11, the size and power consumption of the laser module 10 can be reduced. By monitoring the outputted light beams behind the SOA 12 and the SOA 18 and feeding the monitoring results back to the SOA 12 and the SOA 18, respectively, the power level of the transmitted light and the power level of the local oscillator light are controlled independently. Using the wavelength locker 15, the output wavelength of the LD 11 is stabilized.

Second Embodiment

Figure 4:
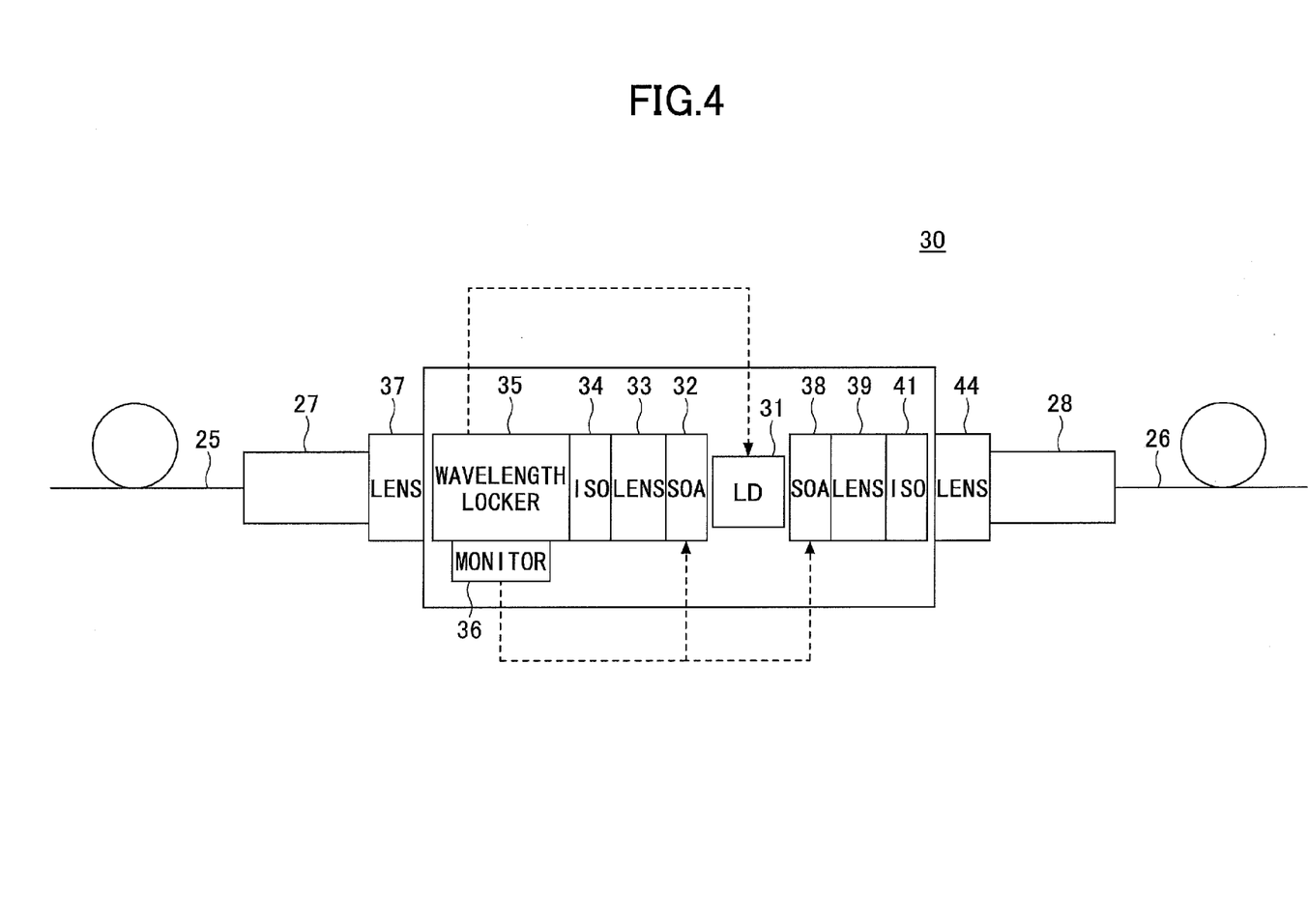
FIG. 4 is a schematic diagram of a laser module according to the second embodiment.

FIG. 4 is a schematic diagram of a laser module 30 according to the second embodiment. In the second embodiment, the beam splitter 22 and the monitor 23 are removed from the structure of the first embodiment. The output levels of the light beams from both end faces of the LD 31 are controlled based upon the monitoring result of the monitor 36 provided on one side of the LD 31.

The laser module 30 has a single laser diode (LD) 31. Along the optical axis of the LD 31, a SOA 32, a lens 33 and an optical isolator 34 are arranged on one side of the LD 11, while a SOA 38, a lens 39 and an optical isolator 41 are arranged on the other side of the LD 31. A wavelength locker 35 and a monitor 36 are provided to said one side of the LD 31.

Light power is monitored by the monitor 36 positioned behind the SOA 32, and the monitoring result is fed back to the SOA 32 and the SOA 38 to stabilize the outputted light levels. The wavelength locker 35 monitors the oscillating wavelength of the LD 31. The wavelength of the LD 31 is controlled based upon the monitoring result by the wavelength locker 35.

The structure of the second embodiment can further reduce the size of the laser module 30 compared with the first embodiment. The wavelengths of both the transmitted light and the local oscillator light can be stabilized as in the first embodiment.

Figure 5:
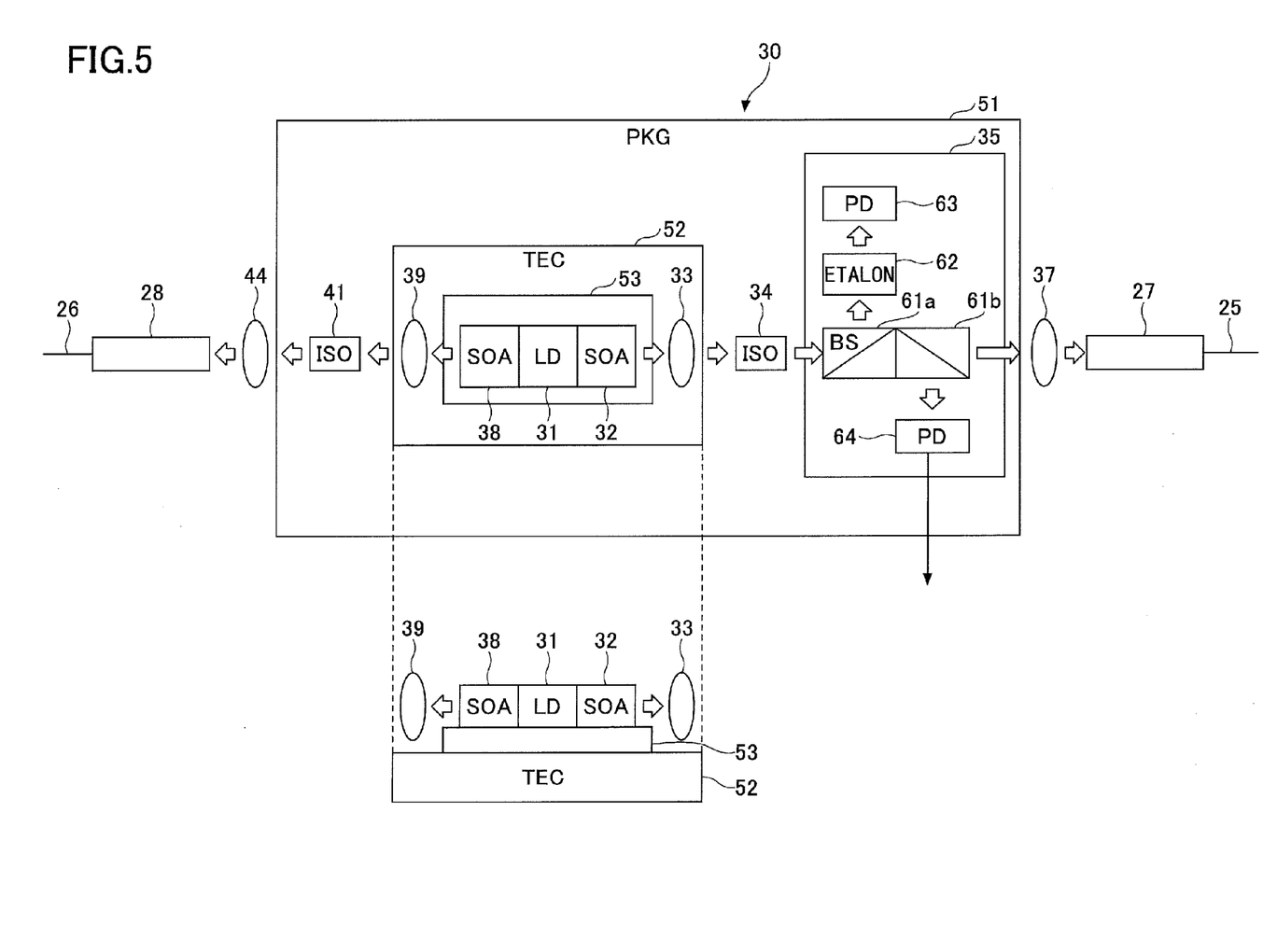
FIG. 5 illustrates a top view of a packaged laser module of FIG. 4, together with a vertical cross-sectional view of the laser mounted section taken along the optical axis of the device.

FIG. 5 illustrates the laser module 30 of FIG. 4 in more detail. The laser module 30 is packaged on a package substrate 51. On the package substrate 51 are arranged a thermoelectric cooler (TEC) 52, optical isolators 34 and 41, and a wavelength locker 35.

The LD 31 is mounted via a carrier 53 on the TEC 52. On respective sides of the LD 31, the SOA 32 and the SOA 38 are arranged along the optical axis of the LD 31. The output of the SOA 32 is coupled to the optical isolator 34 by the lens 33 arranged on the TEC 52. The output of the SOA 38 is coupled to the optical isolator 41 by the lens 39 arranged on the TEC 52.

The TEC 52 is used to stabilize the temperature of the LD 31, and connected to a driving controller (not illustrated). The LD 31, the SOA 32 and the SOA 38 are fabricated monolithically over the carrier 53. If the LD 31 is structured by a DFB array, optical couplers (or optical multiplexers) are inserted between the LD 31 and the SOA 33 and between the LD 31 and the SOA 38.

The light beam output from the SOA 32 passes through the lens 33 and the optical isolator 34 and is input to the wavelength locker 35. The wavelength locker 35 has beam splitters 61a and 61b, an etalon 62, and photodetectors (such as photodiodes) 63 and 64.

A portion of the light beam incident on the wavelength locker 35 is reflected by the beam splitter 61a and guided by the etalon 62 to the PD 63. The transmittance of the etalon 62 has wavelength dependency, and transmits only a light component of a specific wavelength. The central wavelength of the transmitted light is detected by the PD 63. The detection result of the PD 63 is fed back by the above-described driving controller to the TEC 52 to carry out temperature control for the LD 31. Consequently, the wavelength of the LD 31 is locked to a fixed wavelength.

The other portion of the light beam is transmitted through the beam splitter 61a. A portion of the light component transmitted through the beam splitter 61a is reflected by the beam splitter 61b and guided to the PD 64. The PD 64 is used to detect the power level of the output light of the laser module 30.

The light component transmitted through the beam splitter 61b is one of the outputs from the laser module 30, and coupled by the lens 37 to the optical fiber 25 held in the connector 27. The other of the outputs from the laser module 30 is a light beam passing through the SOA 38, the lens 39 and the optical isolator 41. The output of the optical isolator 41 is coupled by the lens 44 to the optical fiber 26 held in the connector 28.

Figure 6:
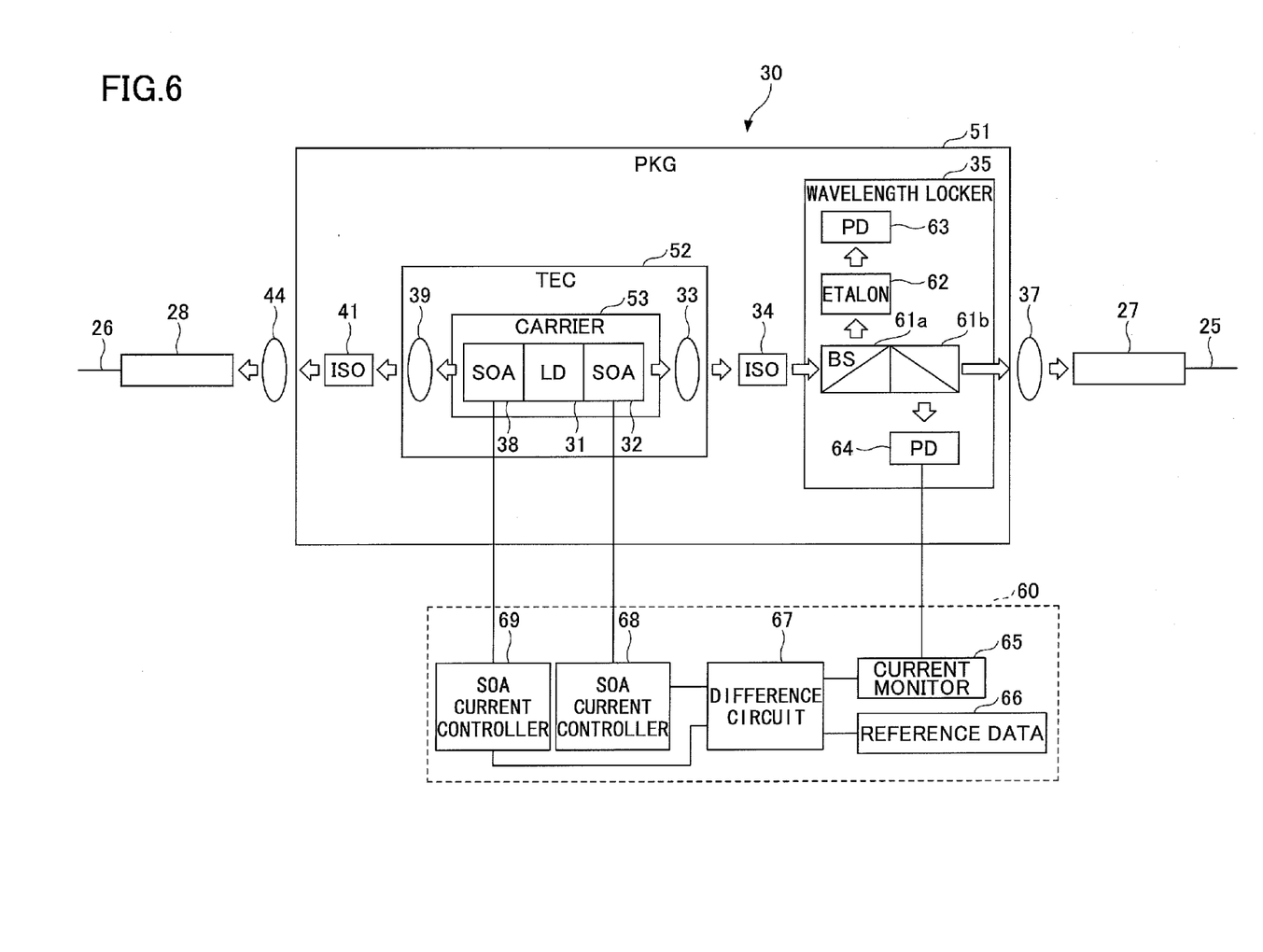
FIG. 6 is a schematic diagram of a control mechanism for the laser module of FIG. 5.

FIG. 6 illustrates a control mechanism 60 to feed the detection result of the PD 64 to the SOA 32 and the SOA 38. The PD 64 converts the incident light to electric current. The electric current output from the PD 64 is detected by a current monitor 65. The output of the current monitor 65 is connected to one input of a difference circuit 67, and a difference from a reference data 66, which is the other input of the difference circuit 67, is detected. The detected difference is supplied to a SOA current controller 68 for the SOA 32 and a SOA current controller 69 for the SOA 38. The SOA current controller 68 controls the SOA 32 so as to minimize the detected difference. The SOA current controller 69 controls the SOA 38 so as to minimize the detected difference.

Although the first embodiment depicted in FIG. 3 does not illustrates an actual example of a control mechanism, the control mechanism 60 of FIG. 6 may be used in the first embodiment. In this case, current monitors are provided for the monitor 16 and the monitor 23 to detect electric currents from the monitors 16 and 23, respectively. A difference between the electric current of the monitor 16 and the reference current is supplied to the SOA 12, and a difference between the electric current of the monitor 23 and the reference current is supplied to the SOA 18. The SOA 12 and the SOA 18 are separately controlled by the outputs of the corresponding current monitors.

Figure 7:
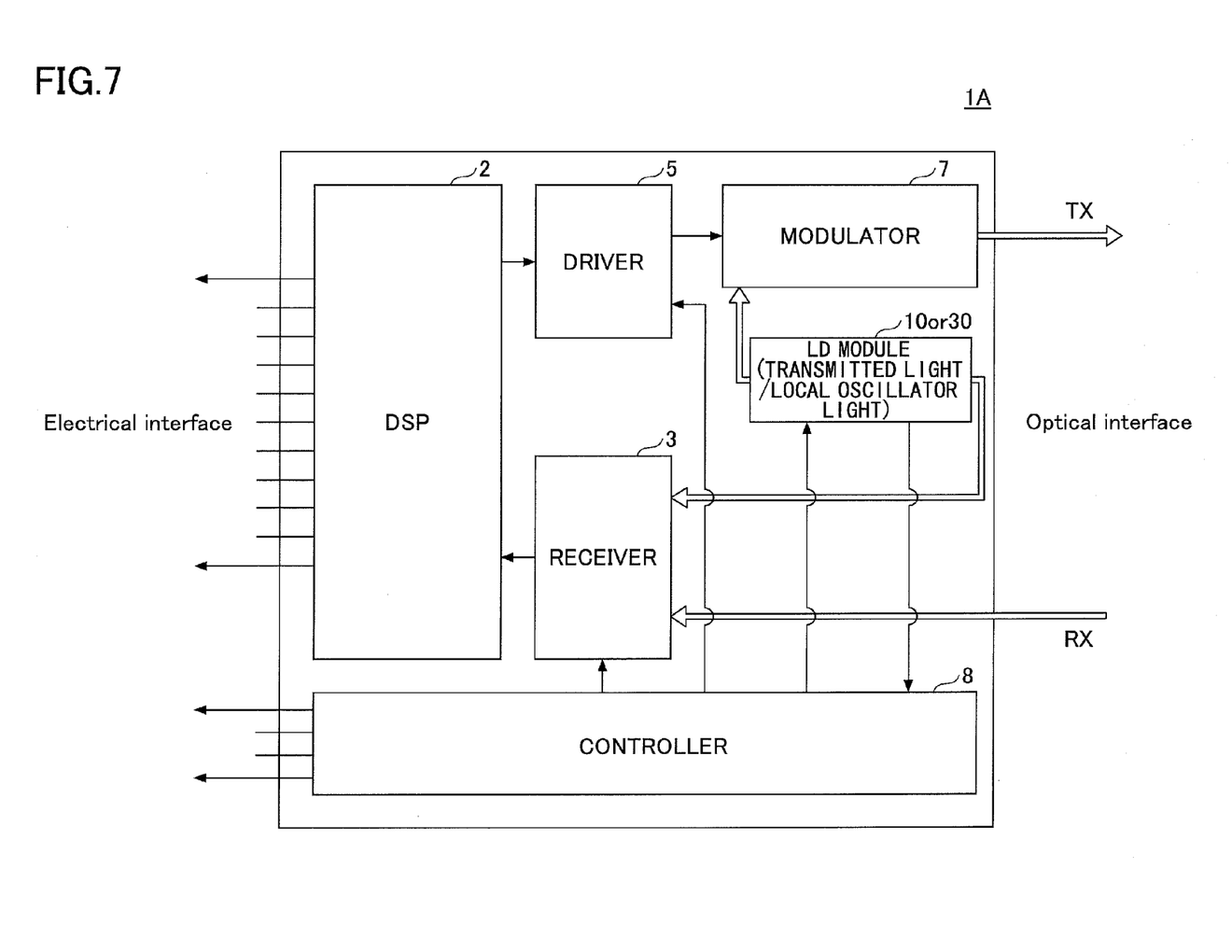
FIG. 7 is a schematic diagram of an optical transceiver using the laser module of the first or second embodiment.

FIG. 7 is a schematic diagram of an optical transceiver 1A using the laser module 10 of the first embodiment or the laser module 30 of the second embodiment. In the following description, laser module 30 is used as an example. The optical transceiver 1A has a DSP 2, a receiver 3, a driver 5, a modulator 7, a controller 8, and a laser module 30.

One output of the laser module 30 is guided as a carrier wave to the modulator 7, and the other output is guided as a local oscillator light to the receiver 3. The controller 8 is connected to the receiver 3, the driver 5, and the laser module 30. The controller 8 includes a control mechanism 60 of FIG. 6 and the driving controller for controlling the TEC 52 according to the output of the PD 63 of the wavelength locker 35.

The DSP 2 converts input signals to, for example, polarization-division multiplexing signals and causes the driver 5 to drive the modulator 7. The modulator 7 modulates the carrier wave (continuous light) emitted from the laser module 30 with the driving data signal. The modulated signal light is output from the transmission block of the optical transceiver 1A.

The receiver 3 receives optical signals propagated through the optical transmission path and carries out separation of mutually orthogonal polarization components. Each of the separated polarization components is detected by local oscillator light from the laser module 30 and separated into an in-phase component and an orthogonal component. Voltage signals corresponding to the detected in-phase and orthogonal components of each of the polarized components are output from the receiver 3. The DSP 2 synchronizes the received signal with the local oscillator light, removes linear distortion or other adverse influence due to wavelength dispersion, and modulates the received signal.

The optical transceiver 1A is made compact with low power consumption using a single laser module 30 (or laser module 10).

Third Embodiment

Figure 8:
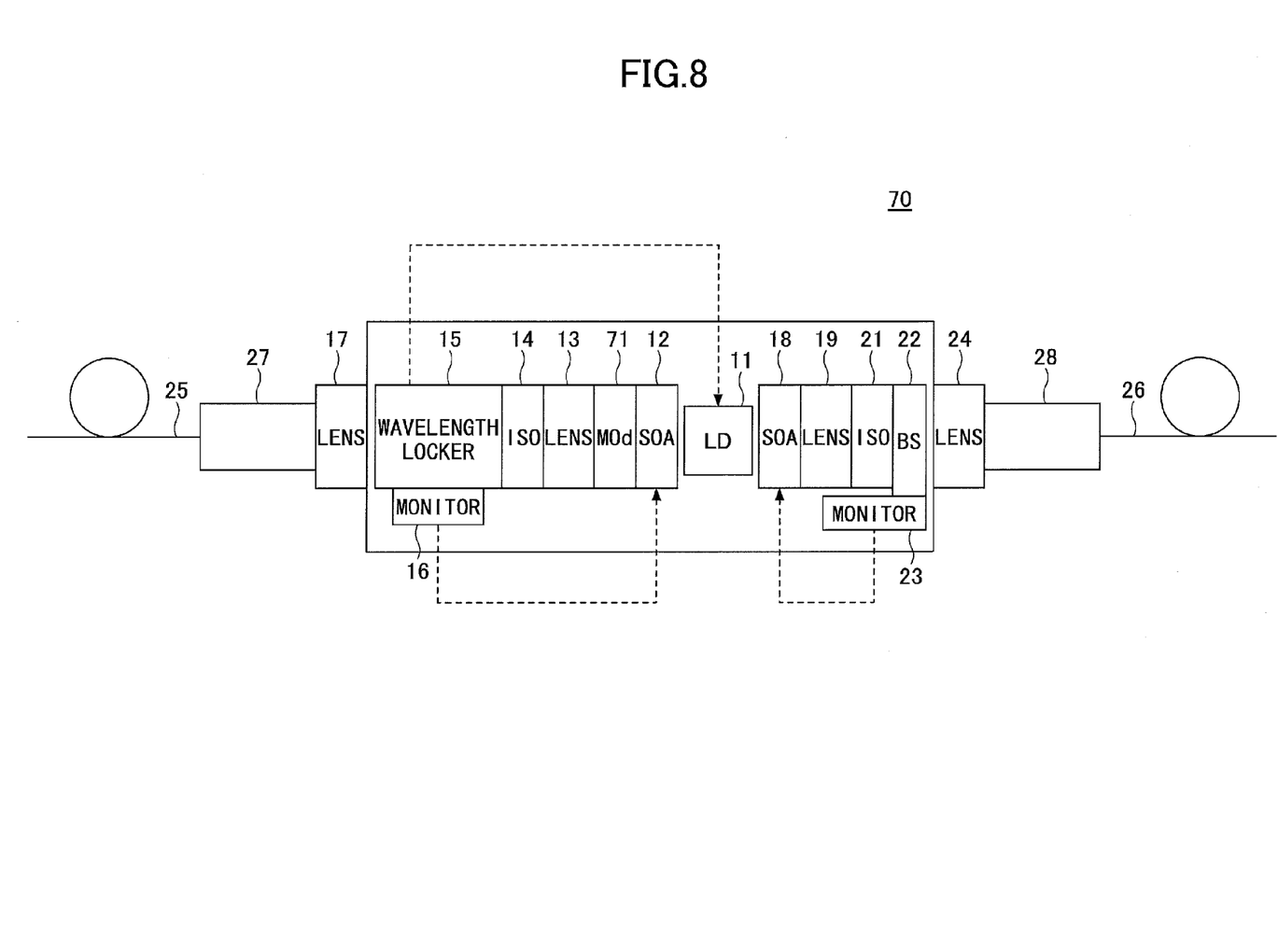
FIG. 8 is a schematic diagram of a laser module according to the third embodiment.

FIG. 8 is a schematic diagram of a laser module 70 according to the third embodiment. In the third embodiment, a modulator 71 is assembled in the laser module 70.

The laser module 70 has a single light source such as a LD 11. On one side of the LD 11, a SOA 12, a modulator 71, a lens 13, an optical isolator 14, and a wavelength locker 15 are arranged in this order in the first light beam emitting direction of the LD 11. A portion of the light component output from the wavelength locker 15 is input to a monitor 16. On the other side of the LD 11, a SOA 18, a lens 19, an optical isolator 21, and a beam splitter 22 are arranged in this order in the second light beam emitting direction. A portion of the light component split by the beam splitter 22 is input to a monitor 23.

The modulator 71 is an arbitrary type of optical modulator making use of, for example, change of index of refraction under application of an electric field, change of index of refraction due to electroabsorption, or change of index of refraction due to temperature change. The modulator 71 can be fabricated together with the LD 11 and the SOA 12 on the same substrate using a silicon photonics technology. A driving data signal is supplied from the driver 5 (see FIG. 9) to the modulator 71 and the light beam output from the LD 11 is modulated. In this example, the light beam emitted from the section with the modulator 71 is used as signal light or transmitted light.

The monitor 16 positioned behind the SOA 12 monitors the output power level of one beam of the LD 11 and feeds the monitoring result back to the SOA 12. The monitor 23 positioned behind the SOA 18 monitors the output power level of the other beam of the LD 11 and feeds the monitoring result back to the SOA 18. The wavelength locker 15 stabilizes the wavelength of the output light of the LD 11. These structures are the same as those described in the first embodiment.

Figure 9:
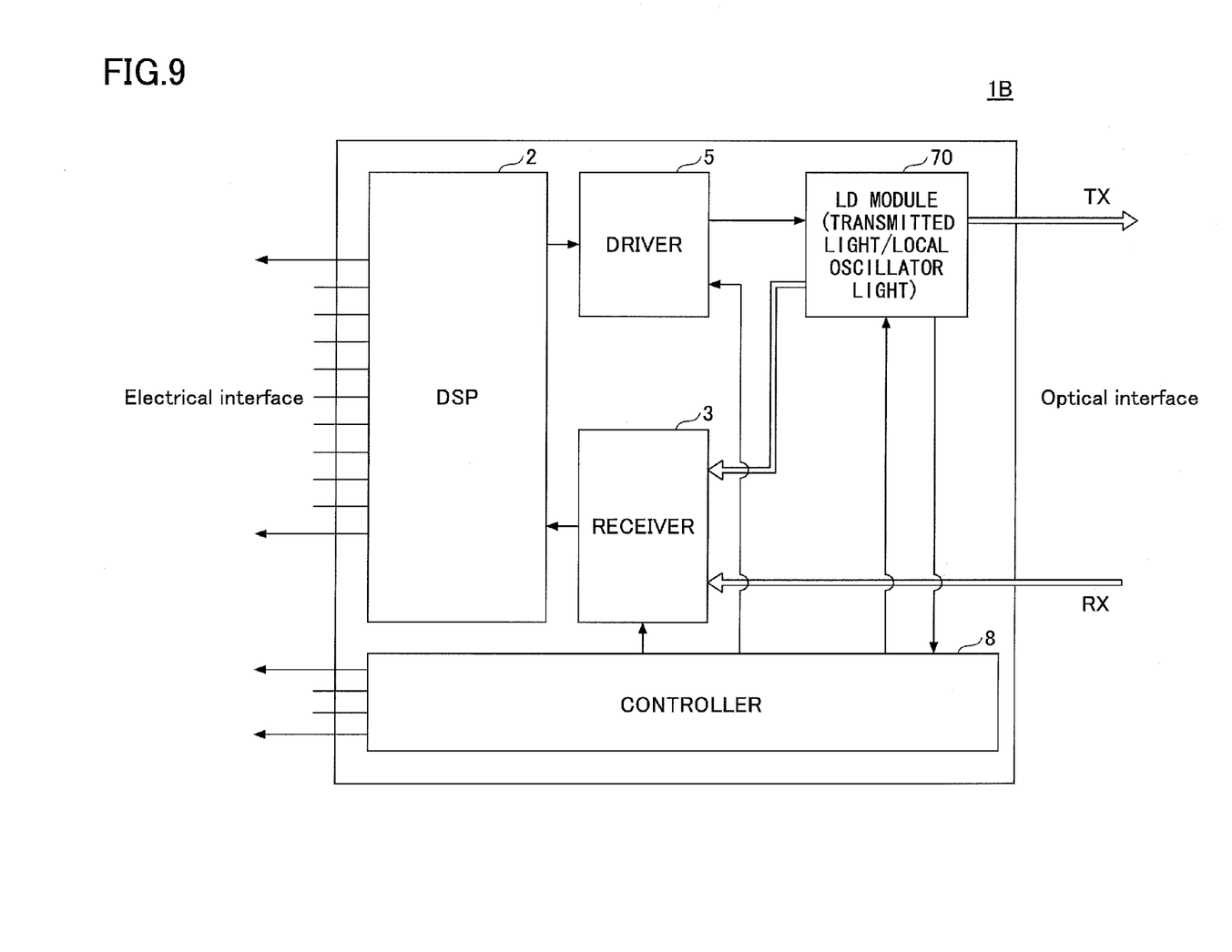
FIG. 9 is a schematic diagram of an optical transceiver using the laser module of the third embodiment.

FIG. 9 is a schematic diagram of an optical transceiver 1B using the laser module 70 of FIG. 8. The optical transceiver 1B has a DSP 2, a receiver 3, a driver 5, a controller 8, and the laser module 70.

One of the outputs of the laser module 70 is used as local oscillator light and connected to the input of the receiver 3. The other of the outputs of the laser module 70 is used as signal light and transmitted from the optical transceiver 1B. The controller 8 is connected to the receiver 3, the driver 5, and the laser module 70.

The controller 8 controls the SOA 12 and the SOA 18 independently from each other based upon the electric currents output from the monitor 16 and the monitor 23 (FIG. 8) of the laser module 70. The controller 8 also controls the wavelength of the LD 11 based upon the output of the wavelength locker 15.

The DSP 2 converts input signals to, for example, polarization-division multiplexing signals and causes the driver 5 to drive the modulator 71 of the laser module 70. The signal light modulated by the modulator 71 is output from the laser module 70.

The receiver 3 receives optical signals propagated through the optical transmission path and carries out separation of mutually orthogonal polarization components. Each of the separated polarization components is detected by local oscillator light from the laser module 70 and separated into an in-phase component and an orthogonal component. Voltage signals corresponding to the detected in-phase and orthogonal components of each of the polarized components are output from the receiver 3. The DSP 2 synchronizes the received signal with the local oscillator light, removes linear distortion or other adverse influence due to wavelength dispersion, and modulates the received signal.

The size of the optical transceiver 1B of FIG. 9 can be further reduced compared with the structure of FIG. 7 because the external modulator arranged separately from the laser module is eliminated.

The laser module 70 in which the modulator 71 is incorporated may be used in the second embodiment to control the SOA 32 and the SOA 38 independently based upon one monitor output.

Fourth Embodiment

Figure 10:
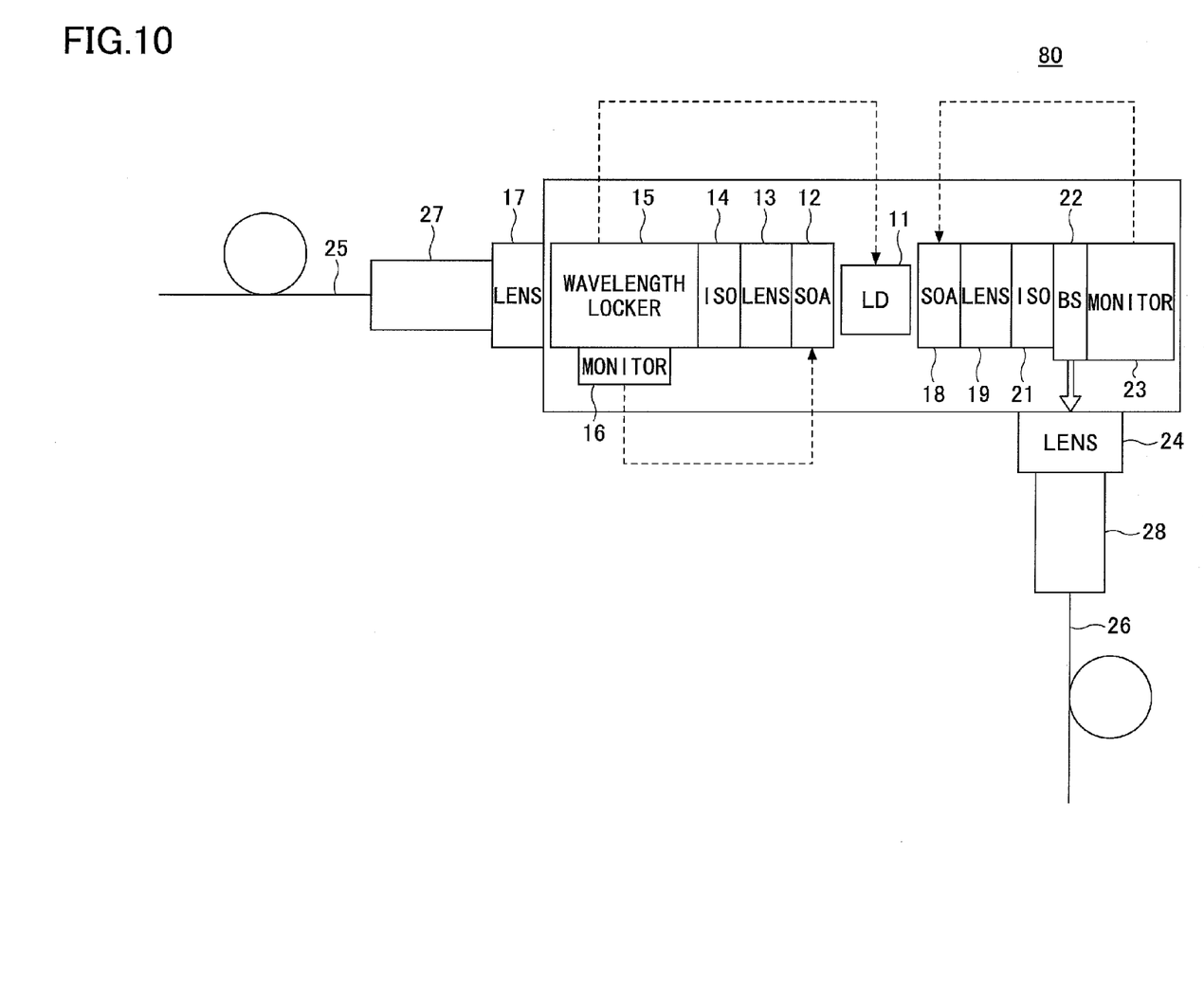
FIG. 10 is a schematic diagram of a laser module according to the fourth embodiment.

FIG. 10 is a schematic diagram of a laser module 80 according to the fourth embodiment. In the first through third embodiments, two light beams emitted from the two opposite outputting faces of the laser module are guided in directions opposite to each other. In the fourth embodiment, two light beams emitted from the laser module 80 are guided in directions orthogonal to each other.

The laser module 80 has a single light source such as a LD 11. On one side of the LD 11, a SOA 12, a lens 13, and an optical isolator 14 are arranged in this order along the optical axis of the LD 11. On the other side of the LD 11, a SOA 18, a lens 19, and an optical isolator 21 are arranged in this order along the optical axis of the LD 11. A wavelength locker 15 and a monitor 16 are further arranged on said one side, and a beam splitter 22 and a monitor 23 are arranged on the other side.

The first light beam emitted from the LD 11 is amplified by the SOA 12, transmitted through the lens 13, the optical isolator 14 and the wavelength locker 15, and output in a direction parallel to the optical axis of the LD 11. The second light beam emitted from the LD 11 is amplified by the SOA 18, and transmitted through the lens 19 and the optical isolator 21. A portion of the second light beam having passed through the optical isolator 21 is deflected by the beam splitter 22 in a direction orthogonal to the optical axis of the LD 11. The deflected light component is coupled by the lens 24 to the optical fiber 26 held in the connector 28.

The other light component of the second light beam goes straight through the beam splitter 22, and it is converted into an electric current by the monitor 23. The electric power level is monitored by a controller 8 (see FIG. 11), and the SOA 18 is controlled based upon the monitoring result.

The structure of the other side furnished with the wavelength locker 15 is the same as that in the first embodiment, and the redundant explanation is omitted.

Figure 11:
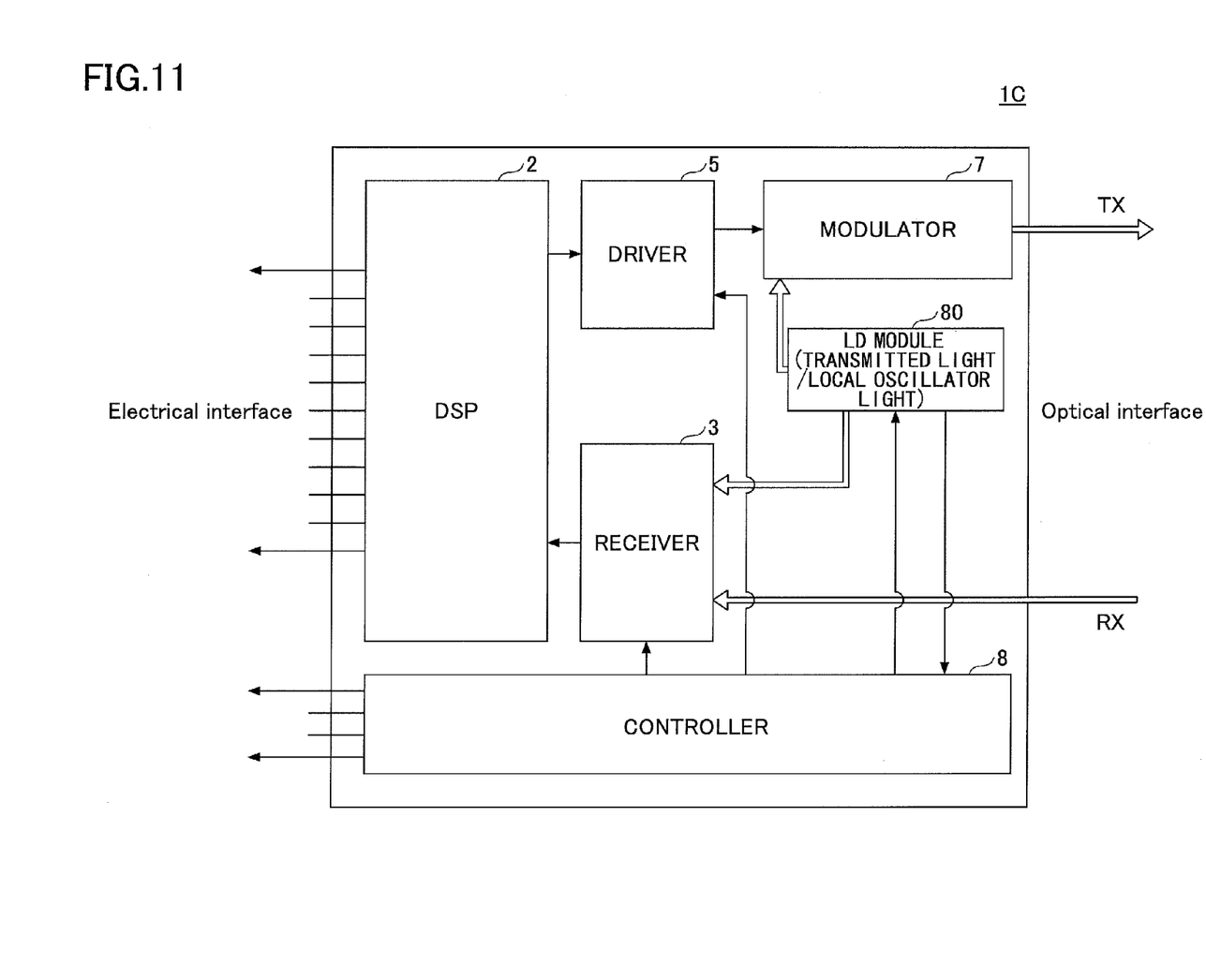
FIG. 11 is a schematic diagram of an optical transceiver using the laser module of the fourth embodiment.

FIG. 11 is a schematic diagram of an optical transceiver 1C using the laser module 80. The first light beam emitted from one end face of the laser module 80 is input to the modulator 7. The second light beam is emitted from a side of the laser module 80 in the direction orthogonal to the first light beam and input to the receiver 3.

The operations of the DSP 2, the driver 5, the modulator 7 and the controller 8 are the same as those in the first through third embodiments, and explanation for them is omitted.

In general, a light source such as a laser module is arranged at or near the edge or a corner of the optical transceiver. By emitting the transmitted light and local oscillator light at an angle of 90 degrees in the laser module 80, freedom of device implementation is improved and a compact structure is realized advantageously.

The arrangement of the fourth embodiment may be applied to the third embodiment using a laser module in which a modulator is incorporated. In this case, the laser module with a modulation function is positioned at a corner of the optical transceiver. This arrangement can further reduce the size of the optical transceiver.

The first through fourth embodiments can be combined arbitrarily with each other. In any combinations, a single light source (such as a laser module) is used to output two light beams, and transmitted light and local oscillator light are controlled independently from each other. The size and power consumption of the optical transceiver can be reduced.

By inserting ab additional optical element such as a beam splitter between the lens 17 and the lens 24 (FIGS. 3, 8 and 10) or between the lens 37 and the lens 44 (FIGS. 4-6), a light source module with two or more output beams can be realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A light source module comprising:
   a single light source with two opposite light outputting faces;

a first optical amplifier and a second optical amplifier provided on opposite sides of the light source adjacent to the corresponding light outputting faces; and a first monitor configured to monitor an output of the first optical amplifier, wherein a power output level of the first optical amplifier is controlled independently from the second optical amplifier based upon a monitoring result of the first monitor, and wherein a first light beam output from one of the first optical amplifier and the second optical amplifier is a carrier wave for transmission of an optical signal, and a second light beam output from the other of the first optical amplifier and the second optical amplifier is a local oscillator light for receiving an optical signal.

2. The light source module according to claim 1, further comprising:

a second monitor configured to monitor an output of the second optical amplifier, wherein a power output level of the second optical amplifier is controlled based upon a monitoring result of the second monitor.

3. The light source module according to claim 1, wherein the monitoring result of the first monitor is supplied to the first optical amplifier and the second optical amplifier, and the power output level of the first optical amplifier and a power output level of the second optical amplifier are independently controlled based upon the monitoring result of the first monitor.

4. The light source module according to claim 1, further comprising:

a wavelength locker positioned behind the first optical amplifier in a direction of an optical axis of the light source, wherein a wavelength of the light source is controlled to be a constant wavelength by the wavelength locker.

5. The light source module according to claim 4, wherein the first monitor is a photodetector configured to detect a light component split by the wavelength locker.

6. The light source module according to claim 1, further comprising:

an optical system configured to guide light beams emitted from said two opposite outputting faces of the light source in directions opposite to each other.

7. The light source module according to claim 1, further comprising:

an optical system configured to guide light beams emitted from said two opposite outputting faces of the light source in directions orthogonal to each other.

8. An optical transceiver comprising:

a light source module that has a single light source with two opposite light outputting faces, a first optical amplifier and a second optical amplifier provided on opposite sides of the light source adjacent to the corresponding light outputting faces, and a first monitor configured to monitor an output of the first optical amplifier, a power output level of the first optical amplifier being controlled independently from the second optical amplifier based upon a monitoring result of the first monitor;

a driver configured to output a driving signal based upon a transmitted signal to modulate a first light beam emitted from the light source module;

a receiver configured to detect received light using a second light beam emitted from the light source module; and a controller configured to control the power output level of the first optical amplifier independently from the second optical amplifier based upon a monitored output of the light source module, wherein the first light beam is amplified by one of the first optical amplifier and the second optical amplifier and is a carrier wave for transmission of an optical signal, and the second light beam is amplified by the other of the first optical amplifier and the second optical amplifier and is a local oscillator light for receiving an optical signal.

9. The light source module according to claim 1, further comprising:

a modulator positioned behind either one of the first optical amplifier and the second optical amplifier in a direction of an optical axis of the light source and configured to modulate a light beam output from said either one of the first optical amplifier and the second optical amplifier based upon a driving data signal input externally.

* * * * *